S. M. & E. G. TEETER.
COMBINED FENDER AND APRON.
APPLICATION FILED AUG. 8, 1911.
1,022,278.
Patented Apr. 2, 1912.
2 SHEETS—SHEET 2.
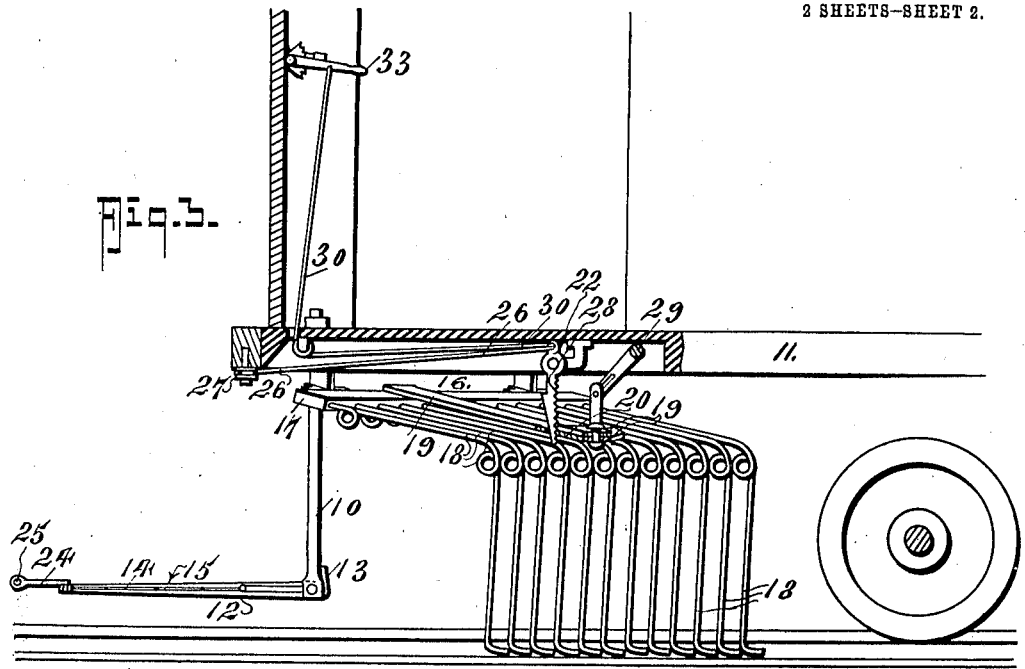
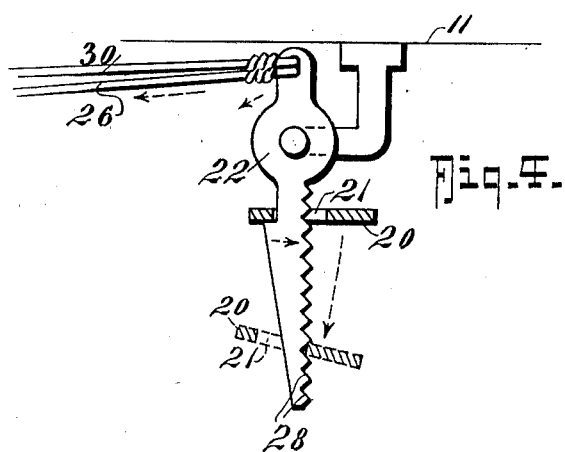

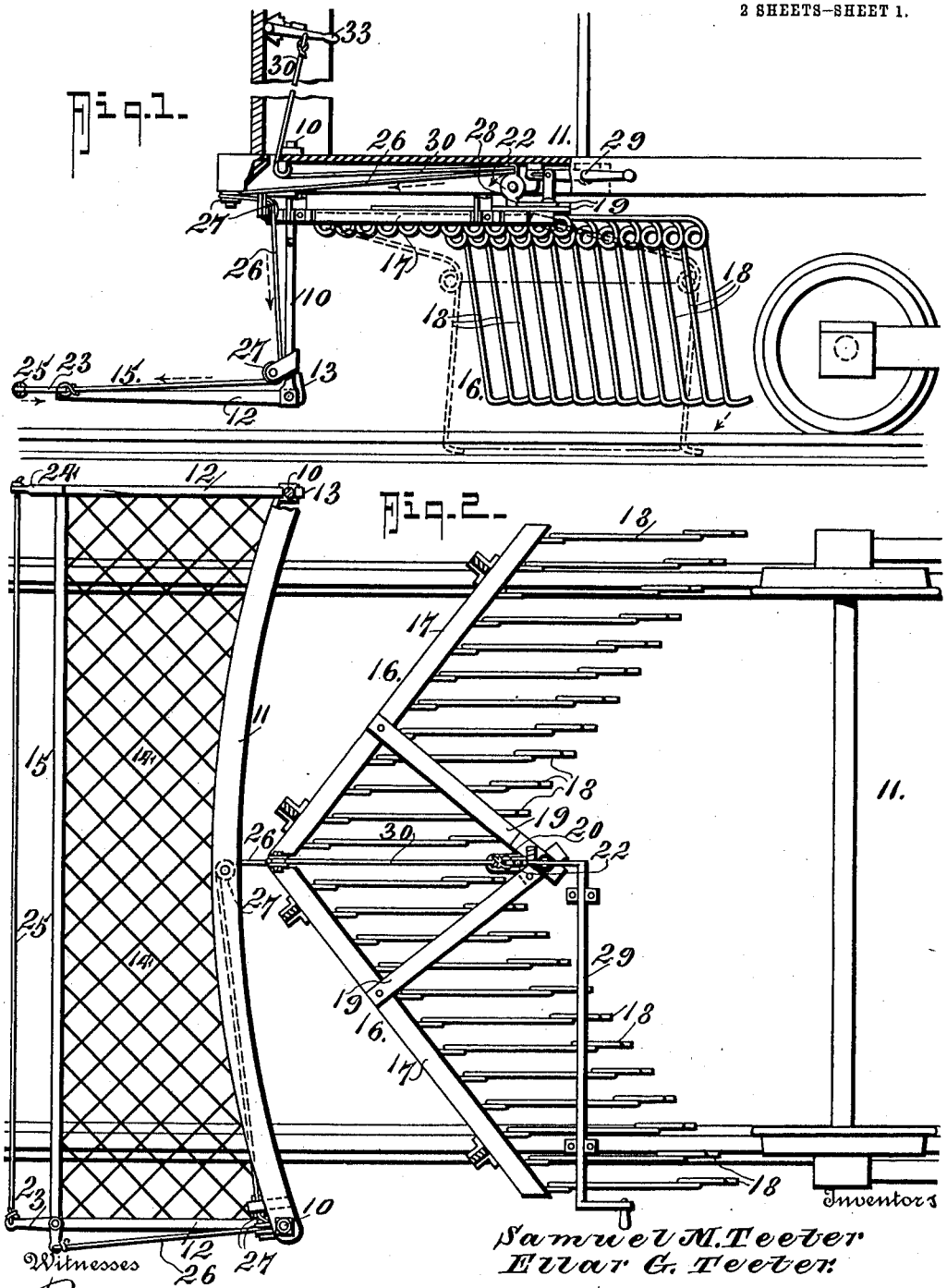

UNITED STATES PATENT OFFICE.

SAMUEL M. TEETER AND ELLAR G. TEETER, OF ST. LOUIS, MISSOURI.

COMBINED FENDER AND APRON.

1,022,278. Specification of Letters Patent. Patented Apr. 2, 1912.

Application filed August 8, 1911. Serial No. 642,932.

*To all whom it may concern:*

Be it known that we, SAMUEL M. TEETER and ELLAR G. TEETER, citizens of the United States, residing in St. Louis city and State of Missouri, have invented new and useful Improvements in Combined Fenders and Aprons, of which the following is a specification.

An object of the invention is to provide a car fender for attachment to street cars and the like to prevent serious injury to persons struck by the said car.

For the purpose mentioned, use is made of an apron for attachment to the front of the car and projecting forwardly therefrom and a V-shaped fender mounted in the rear of the said apron and depending from the said car, the said fender being disposed immediately in front of the wheels of the car and spaced from the ground with means connecting the said apron and said fender so that when a person is struck by the said apron, the fender will be released to assume an active position and prevent the person from being run over by the wheels of the car.

Reference is to be had to the accompanying drawings consituting a part of this specification, in which similar characters of reference denote corresponding parts in all the views, and in which—

Figure 1 is a side elevation showing our device applied and in initial position, parts being broken away and dotted lines showing the final position of our device. Fig. 2 is a plan view of our device. Fig. 3 is a longitudinal sectional view. Fig. 4 is an enlarged fragmentary vertical section showing the releasing hook and means for operating the same by the operator of the vehicle to which our device is attached.

Referring more particularly to the views, we provide a plurality of vertically depending rods 10 secured to the front of a car 11, and means on the lower end of the said rods and extending laterally outward therefrom are a plurality of arms 12 having flanges 13 engaging the rods 10 to rigidly position the arms 12 relatively to the rods 10 and secured to the said arms 12 and positioned between the same is a network 14, the said arms and network constituting an apron 15. Hingedly mounted on the under side of the car 11, in the rear of the apron 15 is a V-shaped fender 16 consisting of bars 17 brought together at their forward ends to form an apex and secured to the said bars are spring teeth 18 having coiled portions at the horizontal ends thereof, the said teeth being connected to the bars 17 and extended in vertical position. Projecting rearwardly from the upper bars 17 are braces 19 relatively connected at their ends and having secured thereto a lug 20 provided with an aperture 21. To releasably retain the fender 16 in initial position and spaced a distance from the ground, a hook 22 is pivotally mounted on the under side of the car 11 and is adapted to pass through the aperture 21 in the lug 20, thus spacing the fender a distance from the ground, the upper end of the hook 22 being provided with an aperture adapted to receive one end of a cord for a purpose that will be hereinafter more fully disclosed.

The outer ends of one of the arms 12 of the apron 15 has pivotally mounted thereon an L-shaped member 23, the other arm 12 being provided at its outer end with a lug 24 having a cord 25 secured thereto, the said cord being connected to an extension of the L-shaped member 23. Connected to the other extension of the L-shaped member 23 is a second cord 26, the said cord being adapted to pass over suitable rollers 27 and extend rearwardly for connection with the aperture in the upper end of the hook 22.

Assuming that the fender 16 is in initial position, that is, the said fender is raised from the ground, when an object strikes the front of the apron 15 and contacts with the cord 25, the L-shaped member 23 pivotally mounted on one of the arms 12 will be operated to exert a pull on the cord 26, which in turn will operate the hook 22 to release the rear end of the fender 16 and permit the said rear end to drop to the ground, so that should the object striking the front of the apron as mentioned pass beneath the said apron, the said object will be prevented from coming in contact with the wheels of the car by the said fender disposed immediately in front of the front wheels of the said car. To retain the fender in lowered position when the same has been released as mentioned, the lower end of the hook 22 is provided with a vertically extending rack 28 integrally formed on the rear side of the hook 22, the said rack being adapted to engage the lug 20, thus securely holding the fender in lowered position and preventing the same from bouncing up and down. Secured to the braces 19 at their point of connection is a rod 29 extending outwardly to the side of the car and having a crank arm formed at the outer end thereof, the said rod being provided with a handle and journaled to the car so that by grasping the handle and operating the rod the fender can be moved upwardly to reengage the upper end of the hook 22, thus repositioning the fender.

From the foregoing description it will be readily seen that a combined fender and apron is provided and in which the operation of the fender is entirely automatic and the said fender is adapted to operate when an object strikes the mentioned apron. It may happen at times, however, that the operator of the car, generally called the motorman, may desire to lower the fender at will and in order to accomplish this we have provided a cord 30 connected to the hook 22 and having its other end connected to a lever 33 pivotally mounted on the car 11 immediately adjacent the position usually occupied by the motorman, so that by simply operating the lever 33, the hook 22 will release the fender 16 as heretofore mentioned and permit the fender to drop.

Although for the purpose of describing our device we have shown a particular construction thereof, it will be understood that the scope of the invention is defined in the appended claims.

Having thus fully described the invention, what we claim as new, is:—

1. In a combined fender and apron for attachment to vehicles, a plurality of members secured to the front end of the said vehicle and depending therefrom, an apron rigidly secured to the said bars and extending laterally outward therefrom, a fender pivotally mounted on the under side of the vehicle in the rear of the said apron, a hook pivotally mounted on the under side of the said vehicle and adapted for engagement with the said fender to releasably retain the fender a distance from the ground, a cord positioned at the front end of the said apron, an L-shaped member pivotally mounted on the said apron and having one end of the said cord secured thereto and a second cord attached to the said L-shaped member and having connection with the said hook so that when the first cord is moved, the said second cord will be operated to actuate the said hook to release the said fender and permit the same to assume a lowered position.

2. In a device of the class described, the combination of an apron for rigid attachment to a vehicle, a V-shaped fender for pivotal engagement with the under side of the vehicle in the rear of the said apron, the said fender consisting of bars having coiled springs connected thereto and terminating in teeth and means mounted on the said apron and connected with the said fender to automatically release the same so that the said fender will assume a lowered position.

3. In a device of the class described the combination of an apron for rigid attachment to a vehicle, a fender for pivotal engagement with the under side of the vehicle in the rear of the said apron and consisting of bars having coiled springs secured thereto and terminating in vertically depending teeth, an L-shaped member mounted to swing on the said apron and a cord connected to the said member and to the said fender so that when the said member is operated the said cord will be actuated to release the said fender so that the same will assume a lowered position.

In testimony whereof we affix our signatures in presence of two witnesses.

SAMUEL M. TEETER.
ELLAR G. TEETER.

Witnesses:
H. B. SNOKAMP,
MARY M. MURPHY.

Copies of this patent may be obtained for five cents each, by addressing the "Commissioner of Patents, Washington, D. C."